(12) United States Patent
Li et al.

(10) Patent No.: US 11,354,540 B2
(45) Date of Patent: Jun. 7, 2022

(54) FEEDBACK PREDICTION IN A SOCIAL MEDIA APPLICATION

(71) Applicant: International Business Machines Corporation, Armonk, NY (US)

(72) Inventors: Qin Li, Shanghai (CN); Jonathan D. Dunne, Dungarvan (IE); Guang Han Sui, Beijing (CN); Ping Xiao, Changping (CN); Peng Hui Jiang, Beijing (CN); Niao Qing Liu, Beijing (CN); Xiang Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 16/581,807

(22) Filed: Sep. 25, 2019

(65) Prior Publication Data

US 2021/0089826 A1    Mar. 25, 2021

(51) Int. Cl.
   *G06K 9/62* (2022.01)
   *G06Q 50/00* (2012.01)
   *H04L 51/52* (2022.01)

(52) U.S. Cl.
   CPC .......... *G06K 9/6257* (2013.01); *G06Q 50/01* (2013.01); *H04L 51/32* (2013.01)

(58) Field of Classification Search
   CPC ....... H04L 51/32; G06Q 50/01; G06K 9/6257
   See application file for complete search history.

(56) References Cited

U.S. PATENT DOCUMENTS

| 7,933,818 | B1 |   | 4/2011  | Kumar et al. |            |
|-----------|----|---|---------|--------------|------------|
| 8,504,423 | B2 | * | 8/2013  | Rotbard      | G06Q 30/0217 |
|           |    |   |         |              | 705/14.49  |
| 8,812,532 | B2 |   | 8/2014  | Skaf         |            |
| 9,712,481 | B2 | * | 7/2017  | Harasimiuk   | H04L 51/32 |
| 10,333,873| B2 | * | 6/2019  | Perez        | G06Q 10/0639 |
| 2001/0037206 | A1 | * | 11/2001 | Falk      | G06Q 30/0203 |
|           |    |   |         |              | 705/7.32   |

(Continued)

FOREIGN PATENT DOCUMENTS

WO    WO-2013091063 A1 *  6/2013    ............. G06Q 30/01

OTHER PUBLICATIONS

Arce et al., "Fuzzy Labeling of Users in an Educational Intelligent Environment Using an Activity Stream", Recent Advances on Hybrid Approaches for Designing Intelligent Systems, Studies in Computational Intelligence, pp. 593-605, <https://link.springer.com/chapter/10.1007/978-3-319-05170-3_42 >.

(Continued)

*Primary Examiner* — Benjamin M Thieu
(74) *Attorney, Agent, or Firm* — Edward J. Wixted, III (57) ABSTRACT

In an approach, a processor detects at least one training message delivered by a user on a social media application, the training message being accessible by an operator. A processor records training feedback performed by the operator on the social media application regarding to the at least one training message. A processor trains an analysis engine module using (i) the at least one training message as input and (ii) the training feedback as output. A processor generates a predicted feedback for a subsequent message based on the trained analysis engine module.

20 Claims, 7 Drawing Sheets

(56) References Cited

U.S. PATENT DOCUMENTS

2014/0129331 A1\* 5/2014 Spivack ............ G06Q 30/0255
705/14.53
2014/0180811 A1 6/2014 Boal

OTHER PUBLICATIONS

Mell et al., "The NIST Definition of Cloud Computing", Recommendations of the National Institute of Standards and Technology, Special Publication 800-145, Sep. 2011, 7 pages.

\* cited by examiner

FEEDBACK PREDICTION IN A SOCIAL MEDIA APPLICATION

BACKGROUND

The present invention generally relates to information handling in social media, and more specifically, relates to methods, systems and/or computer program products for feedback prediction in a social media application.

Social media is computer-based technology that facilitates the sharing of ideas, thoughts, and information through the building of virtual networks and communities. By design, social media is Internet-based and gives users quick electronic communication of content. Content includes personal information, documents, videos, and photos. Users engage with social media via computers, tablets or smartphones via web-based software or web applications. Nowadays social media applications are ubiquitous worldwide. Lots of information can be collected with the help of social media applications. Some merchants, for example, deploy points reward program for social media application users who post a message (such as Tweets of Twitter®, Timeline of Facebook®, Moments of WeChat® and so on) for recommending goods of the merchants. Teachers, for another example, may also reward points for students who conduct required activities (such as reading books or sporting, and so on) every day. The required activities, in this example, need to be posted as a message to be reviewed by the teacher in a social media application.

SUMMARY

Aspects of an embodiment of the present invention disclose a method, computer program product, and computing system. A processor detects at least one training message delivered by a user on a social media application, the training message being accessible by an operator. A processor records training feedback performed by the operator on the social media application regarding to the at least one training message. A processor trains an analysis engine module using (i) the at least one training message as input and (ii) the training feedback as output. A processor generates a predicted feedback for a subsequent message based on the trained analysis engine module.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
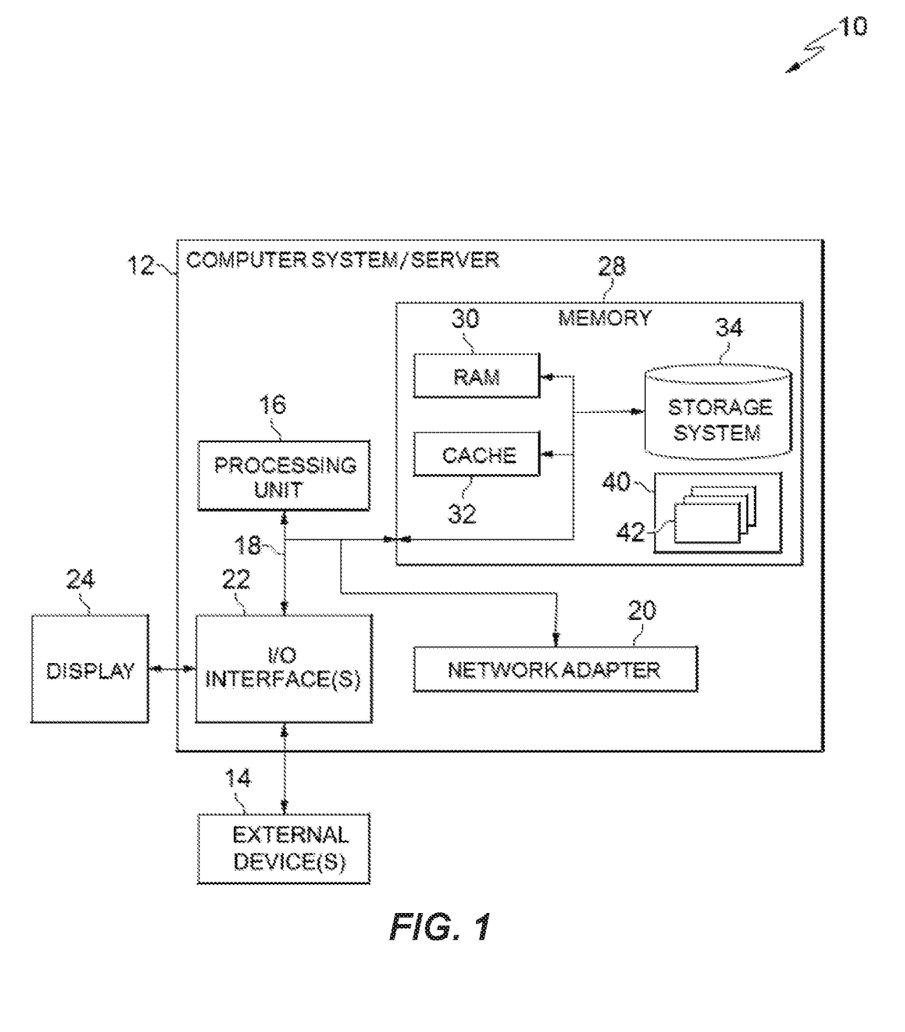
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
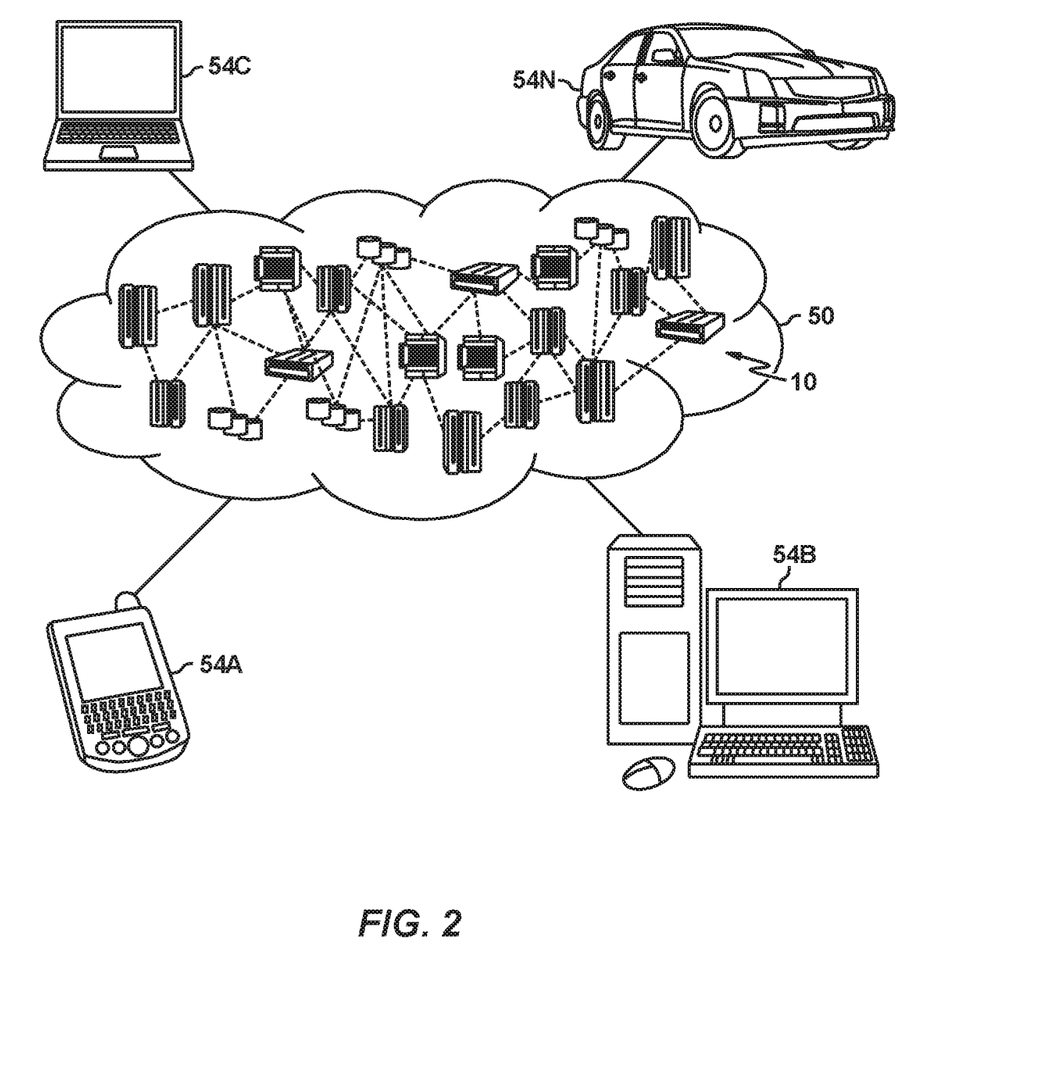
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
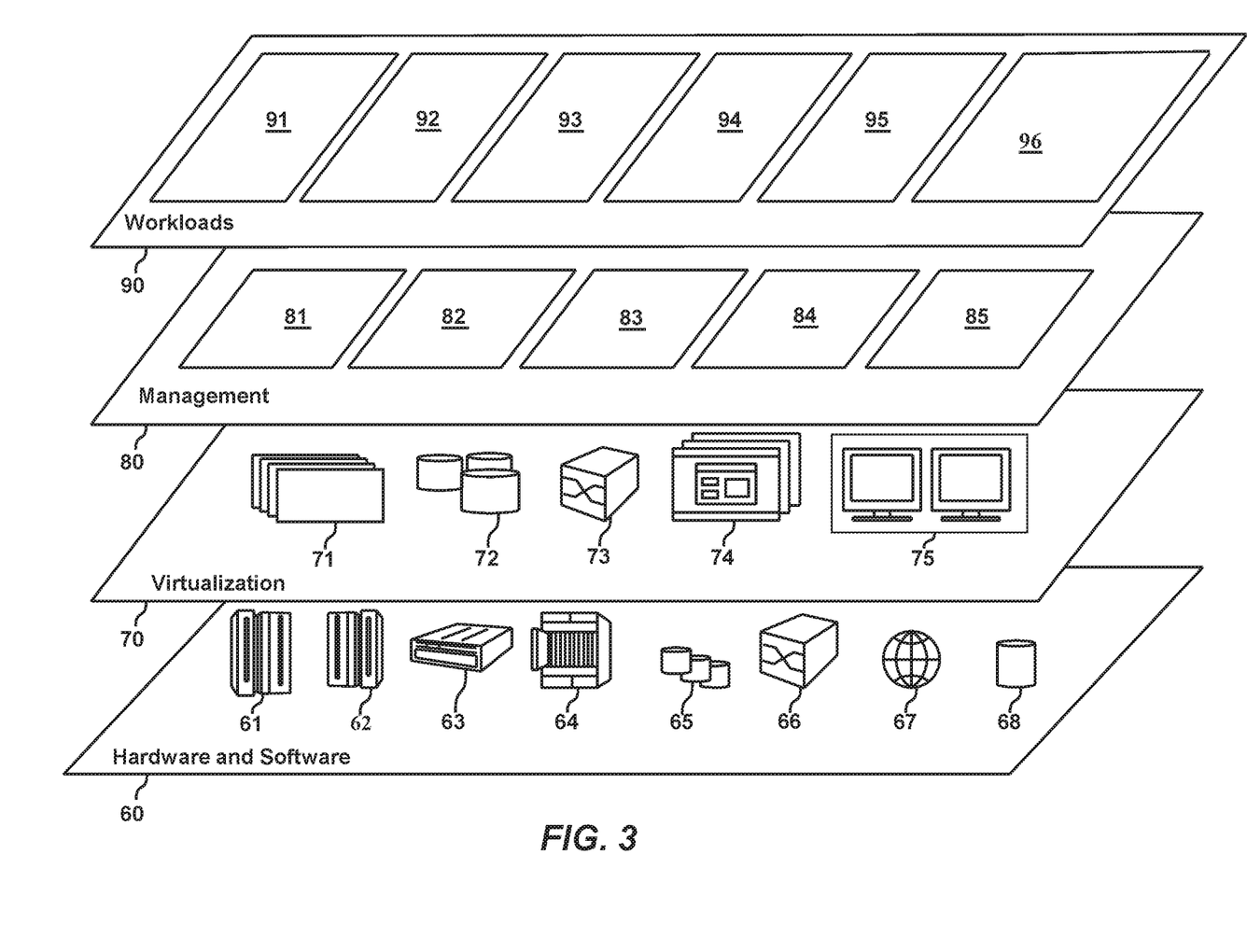
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and feedback prediction 96.

Inventors of this disclosure realized that it would be very time consuming for an operator to input feedback regarding to messages posted by a number of users manually into a social media application (such as an teacher who needs to click "Like" button to messages posted by students as required, a merchant who needs to reward points to customers that post messages regarding to its goods, and so on). The inventors also realized it is difficult for the operator to make a rule-based application to automatically generate feedback in response to a huge number of messages because the rule may be too complicated or may vary from time to time, therefore the rule may be difficult to be described in written. It could be very time consuming, error prone and unrealistic to adopt those rules manually to handle various of messages posted by a number of users. To address at least one of above problems, behavior of an operator can be automatically learned and the feedback can be simulated for being automatically executed on behalf of the operator in accordance with embodiments of this disclosure. The term "operator" is used to differentiate the term "user(s)" in accordance with embodiments of this disclosure, both terms neither limiting titles of roles in the social media application nor suggesting different level of roles in the social media application.

Figure 4:
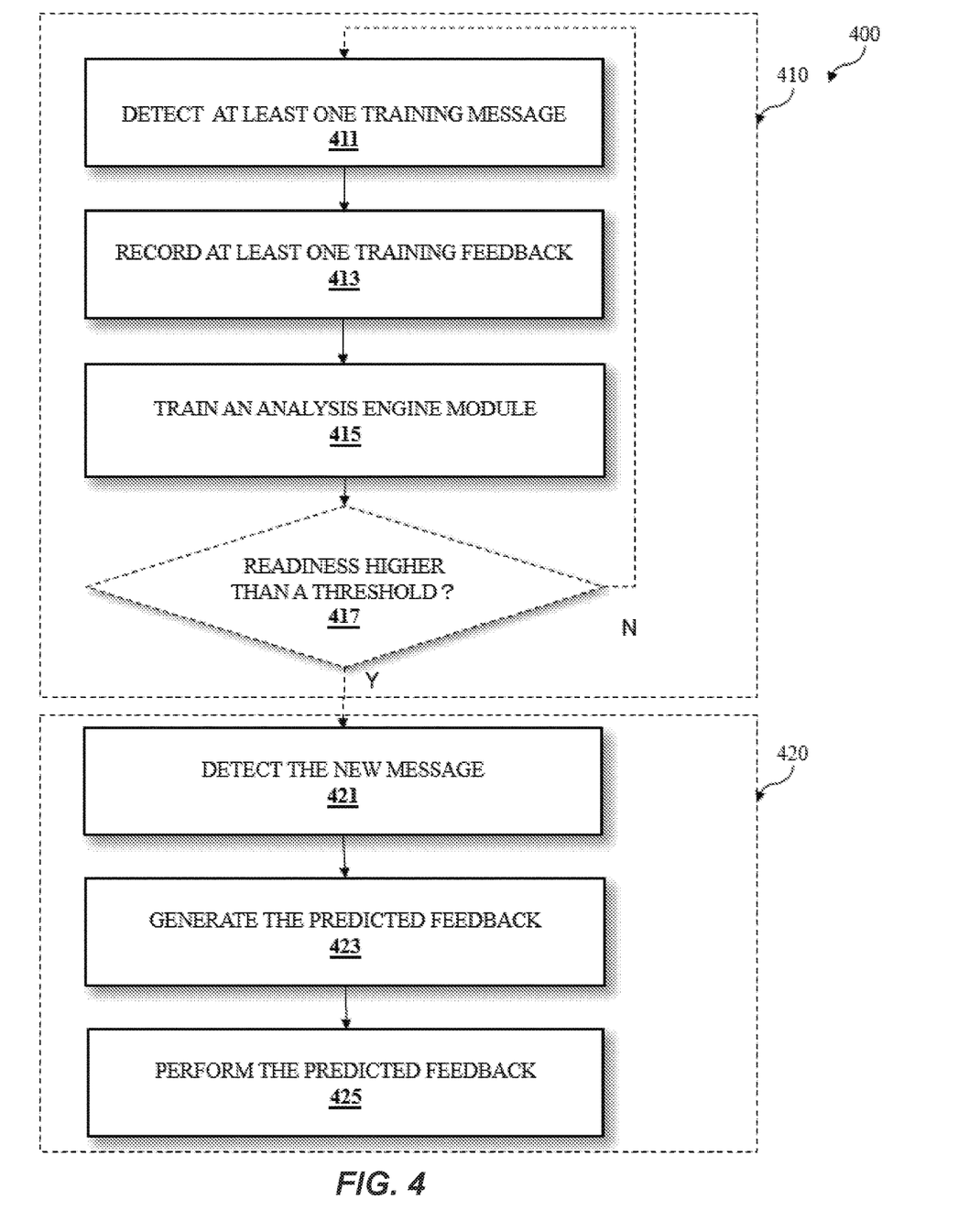
FIG. 4 depicts a flowchart of a method for feedback prediction in accordance with an embodiment of the present disclosure.

FIG. 4 illustrates a flowchart of a method 400 for feedback prediction, in accordance with embodiments of the present disclosure. An analysis engine module can be trained for feedback prediction in a social media application. The social media application can be any type of application or website that enables users to create and share content, or to participate in social networking, such as Facebook®, Twitter®, WeChat®, and so on. In accordance with embodiments of this disclosure, steps during a training phase of the analysis engine module are shown within a dotted box 410, while steps during a runtime phase of the analysis engine module are shown within a dotted box 420.

In Step 411, the approach detects at least one training message delivered by a user on a social media application. The training message can be delivered by the user (for example, shared by the user in a group of WeChat®, posted by the user in Moments of WeChat®, tweets of Twitter®, or Timeline of Facebook®) in any part of the social media application that is accessible by the operator. The operator can be a friend in WeChat®, a follower in Twitter® or Facebook®, etc., who has right to access the training message delivered by the user. The social media application can be accessed via any device including but not limited to mobile phones, laptops, PDAs, computer, server, etc. The message delivered by a user is referred as a training message not because the training message is delivered for training purpose only. Instead, the training message can be created and delivered during normal usage of a user. One advantage in accordance with embodiments of this disclosure is to learn the behavior of an operator on the social media application during the normal usage. The term "training" is used to emphasize the training message can be used for training the analysis engine module.

Figure 6:
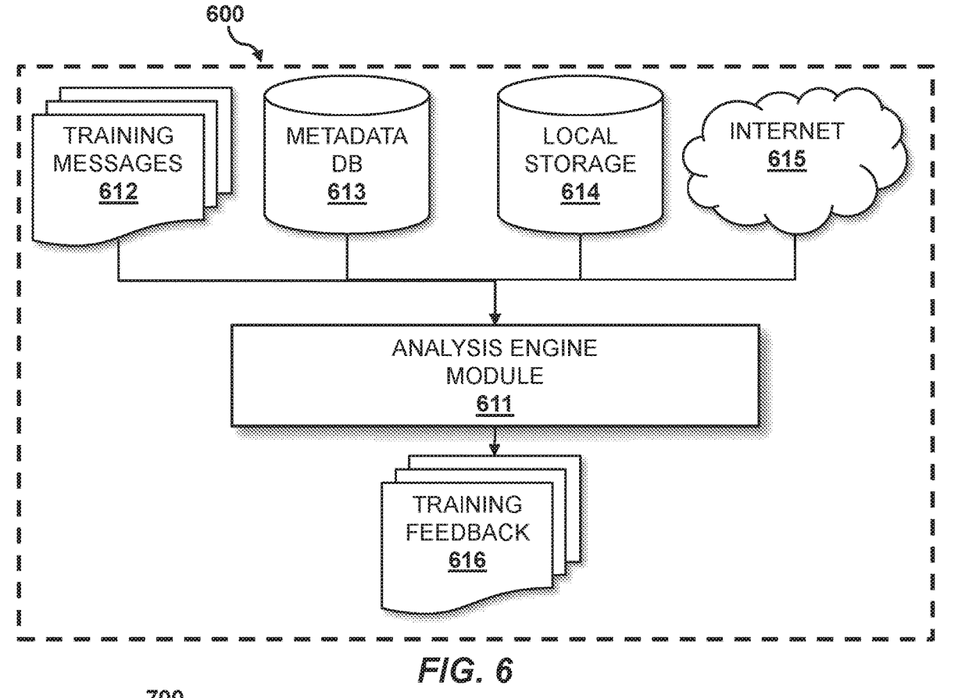
FIG. 6 depicts a diagram of an environment including the analysis engine module during a training phase in accordance with an embodiment of the present disclosure.
Figure 8:
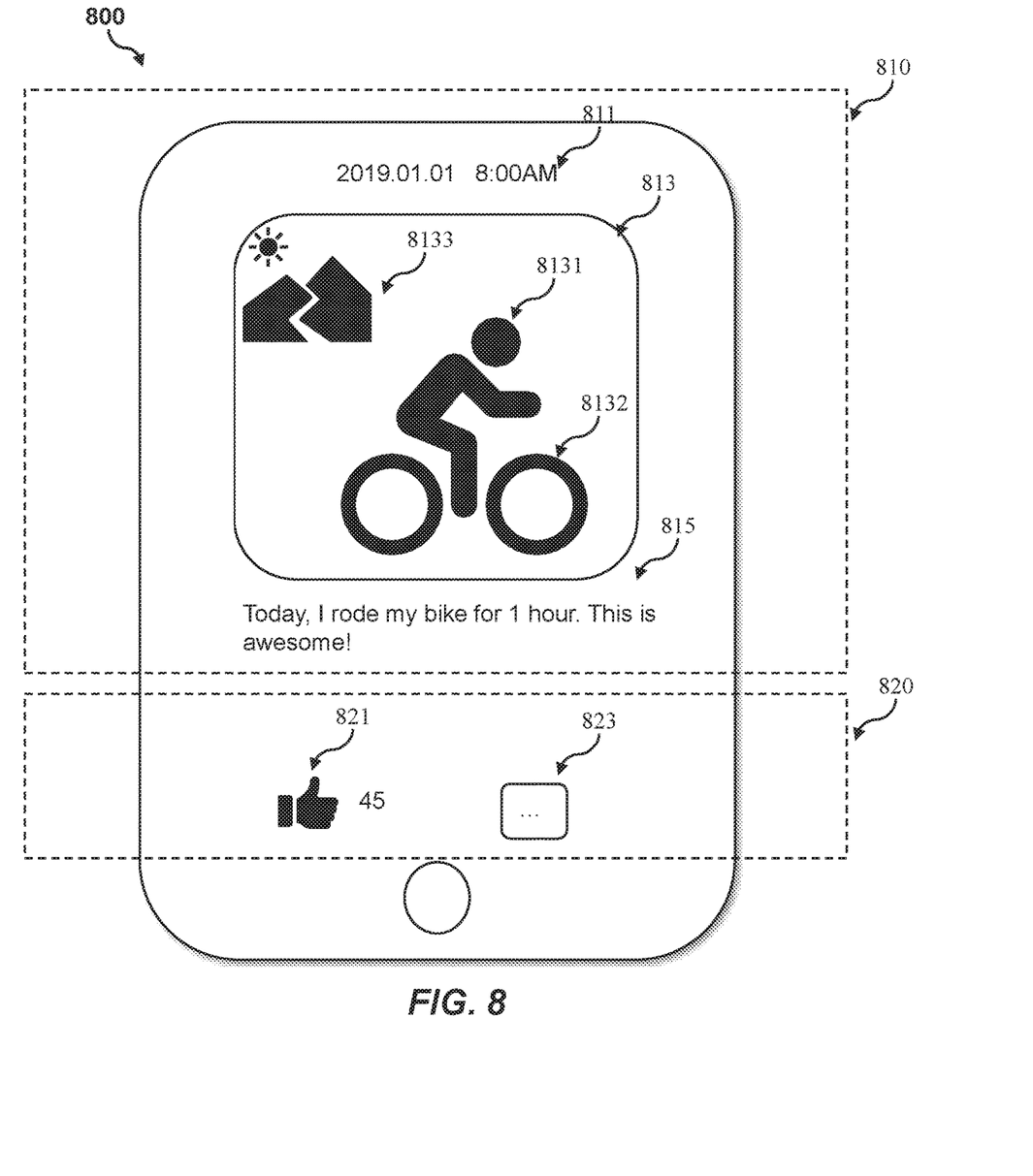
FIG. 8 depicts a sample message in accordance with an embodiment of the present disclosure.

Referring now to FIG. 6 and FIG. 8, additional details of Step 411 will be further described.

FIG. 6 depicts a diagram of an environment 600 including an analysis engine module 611 in a training phase in accordance with embodiments of the present disclosure. During the training phase, a plurality of training messages 612 can be input into the analysis engine module 611 together with a plurality of training feedback 616 as an output.

FIG. 8 depicts a sample screen 800 in accordance with embodiments of the present disclosure. The sample screen comprises a sample message 810 (shown in dotted lines) which can be referred to as a sample for a training message, a test message, or a new message, which will be further illustrated hereinafter. As shown, the sample message part comprises time information 811, a picture 813 and text 815. It is to be understood that these contents of the sample message 810 are described only for the purpose of illustration, without suggesting any limitation as to the scope of the disclosure. More content can be included in the sample message, like audio, video, and so on. The sample screen 800 also comprises a sample feedback part 820 (shown within another dotted line), which includes a "Like" button 821 and a comments button 823, wherein the number "45" besides the "Like" button 821 indicates there are 45 users who have clicked "Like" button regarding to this message 810.

In accordance with embodiments of this disclosure, the input of the analysis engine module can comprise at least one key element which is identified by the operator in the training message. The at least one key element identified can help to train the analysis engine module with a focus on key elements concerned. The key elements can comprise the whole or part of the content in the sample message part 810 of FIG. 8. For example, the key elements can comprise time information 811, head portrait 8131 in picture 813, and text 815. There is no suggestion of limitation regarding to how the at least one key element can be identified by the operator. For example, the key element can be selected by clicking or circling corresponding part on the screen by the operator. If the operator is a teacher who requires students to post their sports photos, then the teacher may identify head portrait 8131 in the picture as a key element instead of other elements like bicycle 8132, sun and mountain 8133. In another example, if the operator is a merchant of bicycle, then the bicycle 8132 in picture 813 (instead of other elements) can be identified as a key element. All those key elements identified by the operator from the message could be treated as a vector composed by a set of elements for input into the analysis engine module.

In accordance with embodiments of this disclosure, the input of the analysis engine module can comprise at least one key element extracted from the training message based on automatic analysis of the training message. For example, with the help of Named-entity recognition (NER) technologies, named entity mentions in unstructured text can be extracted. Therefore, the entities in the unstructured text and corresponding part of images in the picture can be identified as the key elements. For example, since the text 815 in FIG. 8 ("Today, I rode my bike for 1 hour. This is awesome!") mentions both entities "I" and "bike", corresponding elements of head portrait 8131 and bicycle 8132 in the picture 813 (instead of the sun and mountain) can be extracted as the key elements. The extracted key elements in above example may comprise time information 811, head portrait 8131 and bicycle 8132 in the picture 813, entity "I" and entity "bicycle" in the text 815. In accordance with another embodiment of this disclosure, elements shared with common attributes among a plurality of training messages could be identified as the key elements. For example, each term in the training message can be recorded with an attribute which may indicate the related information of such term (like attribute of "ride" can be "sport"), and the term/attribute which is mostly being mentioned in the plurality of training messages can be extracted as the key elements. It should be noted that above examples are provided as examples only, without suggesting any limitation to this disclosure.

In accordance with embodiments of this disclosure, the input of the analysis engine module can further comprise at least one associated element which is associated with the at least one key element (for example, a synonymous element, a lower element, an upper element) and which can be queried (in Step 411 of FIG. 4) from either a local storage 614 or Internet 615 (as shown in FIG. 8). For example, if the head portrait is determined as a key element, then a similar element could be head portraits of the same person queried from a local storage. In another example, "bike," as a similar element of the key element "bicycle," can be further queried from Internet as a supplement to the input of the analysis engine module. It is noted that the purpose of querying associated element is to enrich the sample data for training the analysis engine module.

In accordance with embodiments of this disclosure, the input of the analysis engine module can further comprise metadata which is related to the at least one key elements. The metadata related to the key elements can be any attribute related to the key elements determined. For example, the metadata of key element "I" from the text 815 can be group information of the student in the address book of the teacher, that may indicate, for example, which class the student comes from. Therefore, with enough training messages and training feedback, the analysis engine module can learn that only students from class A can be rewarded by the teacher, while students from other classes or other group of contact cannot get any reward. As shown in FIG. 6, the metadata can be stored, for example, in a metadata database (DB) 613.

Referring now to Step 413 of FIG. 4, the approach records at least one training feedback from the operator regarding to the at least one training message. The training feedback can be any reaction relating to the training message on the social media application. For example, once a student posts a message relating to a sports activity he/she performed today, the teacher may click the "Like" button as feedback regarding to the message. In another example, when a user posts a message relating to a bicycle he/she bought, which brings an effect of advertisement, the merchant may reward some points to the user, the points may be rewarded in the social media application (for example, a prize function in the social media application), or the user may also be rewarded in another application which is independent of the social media application and accessible by the merchant, user, or other operator. The feedback from an operator is referred as "training" feedback not because the feedback is made for training purpose only. Instead, the training feedback can be made during normal usage of the operator. The term "training" is used to emphasize the training feedback can be used for training the analysis engine module. It is noted that the training feedback can be recorded after, or when, the training feedback is made by the operator.

It should also be noted that the training feedback can be recorded as a workflow, characteristic string, table, or any other format of data to describe feedback in detail. For example, the training feedback can include limited options like whether "Like" button is clicked or not (Option A means "Like" button is clicked, Option B means "Like" button is not clicked). Alternatively, the training feedback can include more complicated information in standardized expression, like whether points are rewarded and how many points are rewarded. It is noted that using limited options or standardized expression to record the feedback can simplify feedback prediction.

In addition, in Step 413, the approach matches one of the at least one training feedback with one of the at least one training message as a response to the matched training message. The operator may conduct various behaviors on his/her device or account, some behaviors may be a feedback with regards to a specific message delivered by a user, while other behaviors can be independent of any message. To achieve a better performance, only the behavior that is matched with the training message can be determined as a training feedback. In accordance with embodiments of this disclosure, if the feedback is given on the same message delivered by the user, it can be detected as a matched training feedback. For example, once the operator clicks the "Like" button with regards to a message posted by the user, the activity can be determined as a matched training feedback with regards to the message. In accordance with another embodiment, if a behavior is conducted within a certain period of time since the training message is read by the operator, the behavior can be determined as a matched feedback with regards to the training message. For example, once a user posts a bicycle photo on a social media application, and a merchant gives a reward point to the same user in a separate application right after the message is read, such a reward can be determined as training feedback. In yet another embodiment, if the behavior is conducted with regards to the same user account, in response to the training message is read by the operator, the behavior can be determined as a matched feedback with regards to the training message. In such embodiment, user account in the social media application should be matched with the user account in the separate application, based on having the same user name, same photo, same account number, etc.

In Step 415, the analysis engine module is trained based on the at least one training message as an input and the at least one training feedback as an output, the analysis engine module being used to generate a predicted feedback regarding to a new message delivered by a user. The user delivering the new message can be the same user delivering the training message or can be a new user. The content of the new message can be the same, similar with or substantially different from the training messages. The analysis engine module can include a machine learning model, like Softmax Regression, Convolutional Neural Networks, etc. so that when the input and the output of the machine learning model are determined, the machine learning model can be trained.

Optionally, in Step 417 (presented with dotted lines), the approach determines readiness of the analysis engine module. The readiness indicates the degree of maturity of the analysis engine module, which can be represented by, for example, a percentage score, a progress in a progress bar, etc., which may or may not be shown to the operator. Responsive to the readiness of the analysis engine module being higher than a predetermined threshold, which means the analysis engine module has been trained maturely enough to be used, the approach generates the predicted feedback (Step 423) and the analysis engine module is automatically performed on the social media application, on behalf of the operator (Step 425). Responsive to the readiness of the analysis engine module being not higher than the predetermined threshold, which means the analysis engine module is not trained maturely enough, the approach further trains the analysis engine module during the training phase 410. Detailed steps to determine readiness of the analysis engine module will be further discussed in reference to FIG. 5.

It should be noted that, in accordance with embodiments of this disclosure, the operator can manually decide whether the predicted feedback can be automatically performed based on the readiness shown. The operator, therefore, is given full discretion to decide when the analysis engine module is mature enough to be used to take over the operator's work.

Figure 7:
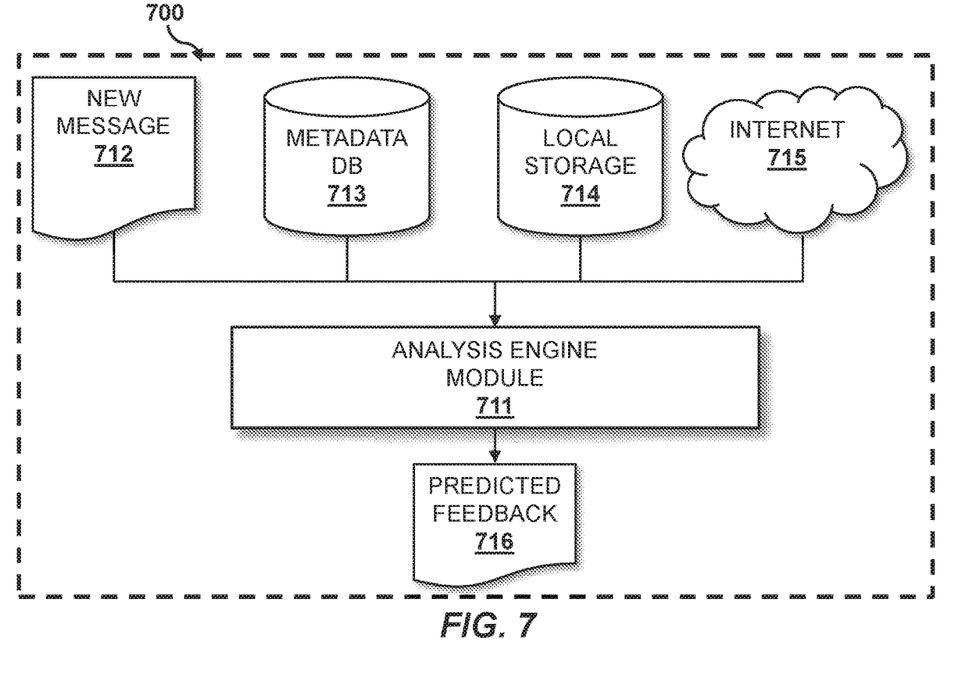
FIG. 7 depicts a diagram of an environment including the analysis engine module during a runtime phase in accordance with an embodiment of the present disclosure.

Now referring to FIG. 7, a diagram of an environment 700 including an analysis engine module 711 in a runtime phase is described, in accordance with an embodiment of the present disclosure. During the runtime phase, the new message 712 can be input into the analysis engine module 711 for generating the predicted feedback 716. The new message can further comprise key elements (either identified by the operator or extracted based on automatic analysis). In addition, at least one associated element of the at least one key element can be queried from either a local storage 714 or the Internet 715. In accordance with embodiments of this disclosure, the input of the analysis engine module 711 can further comprise metadata which is related to the at least one key element of the new message. The metadata related to the at least one key element can be any attribute related to the at least one key element determined. The metadata can be stored, for example, in a metadata DB 713. Additionally, it is noted that analysis engine module 711 can be further stored or shared for reuse.

Back to FIG. 4, so far, the general process of training phase 410 is completed. It is noted that the process of training phase can be transparent to the operator so that the feedback can be recorded automatically without interrupting the normal use of the operator.

Next, the method 400 enters into the runtime phase 420. In Step 421, the approach detects the new message delivered by a user (for example, a new message is posted by a user in the social media application). This step can be achieved automatically, so that the operator does not need to read the new message by himself/herself.

In Step 423, the analysis engine module generates the predicted feedback with the new message as input. The predicted feedback is used to simulate the potential behavior that the operator is going to take with regards to the new message delivered, for example, clicking "Like" button and rewarding points. In accordance with embodiments of this disclosure, the predicted feedback can be automatically performed on the social media application on behalf of the operator (Step 425), so that effort of the operator can be saved as the operator's behavior can be simulated.

In accordance with embodiments of this disclosure, other execution sequences of the steps can be adopted. For example, Step 417 can be executed during the runtime phase 420, more specifically it can be executed after Step 423, and once the readiness is determined higher than the predetermined threshold, the predicted feedback can be automatically performed in Step 425, otherwise once the readiness is lower than (or equal to) the predetermined threshold, the predicted feedback cannot be automatically performed in Step 425.

Figure 5:
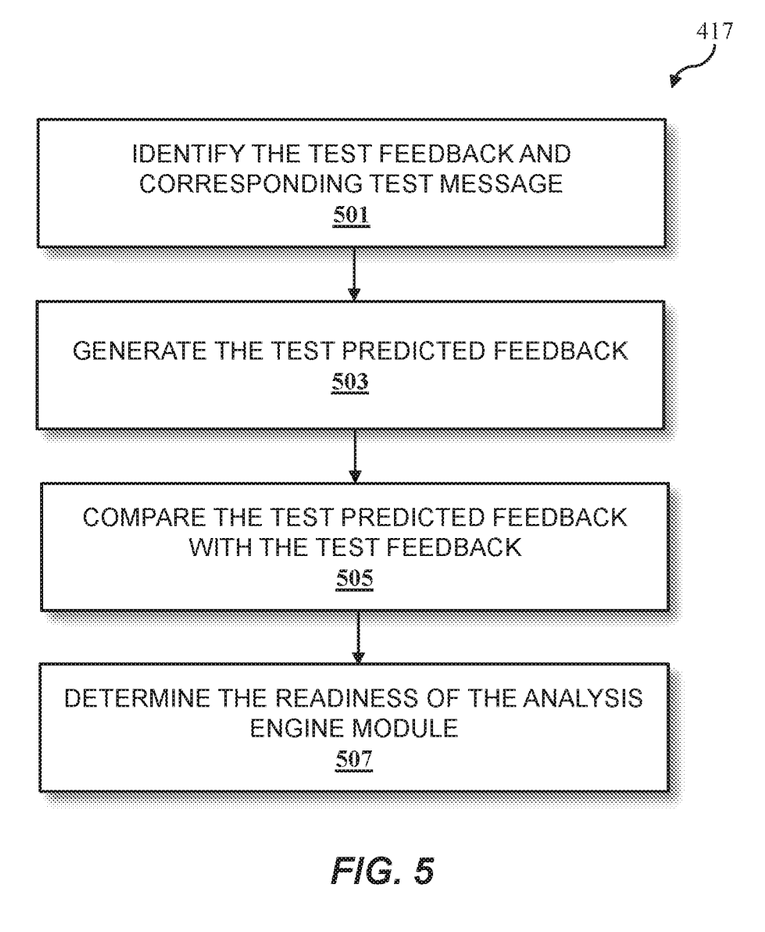
FIG. 5 depicts a flowchart of a method for readiness determination of an analysis engine module in accordance with an embodiment of the present disclosure.

FIG. 5 depicts a flowchart of a method for readiness determination (with reference to Step 417 of FIG. 4) of an analysis engine module, in accordance with embodiments of the present disclosure.

In Step 501, the approach identifies a plurality of pairs of the test feedback and corresponding test message(s). The test feedback is made by the operator in response to the test message delivered by the user. The pair of test feedback and corresponding test message(s) can be identified for the purpose to test the readiness of the analysis engine module. The pair of test feedback and corresponding test message(s) can be generated from runtime operation(s) of the social media application. In accordance with embodiments of the invention, the test message(s) comprises a message from the at least one training message, and the test feedback comprises a feedback from the at least one training feedback. Although the analysis engine module is trained based on the training message and training feedback, using the same set of messages and feedback as test messages and test feedback to test the readiness of the analysis engine module does not necessarily result to a 100% degree of maturity. Actually, the result depends on whether enough training messages and training feedback are used to train the analysis engine module. In such embodiment, the readiness can be determined during the training phase (Phase 410 in FIG. 4). That is, the analysis engine module can be trained mature enough before using.

In accordance with other embodiments of the invention, the test message comprises a message from the new message, and the test feedback comprises a feedback confirmed by the operator regarding the new message. The operator is, therefore, aware that the analysis engine module is currently under a test based on the new message and can manually give feedback as the test feedback.

In Step 503, the analysis engine module generates the test predicted feedback with the test message as input. In Step 505, the approach compares the test predicted feedback with the test feedback, which has been confirmed by the operator as a correct answer for benchmark. In Step 507, the approach determines the readiness of the analysis engine module based on the comparison result. For example, if ten test predicted feedback instances generated from ten test messages are compared with ten correct test feedback instances confirmed by the operator, and a result shows eight test predicted feedback instances are correct, the readiness can be determined as 80%.

It should be noted that the method/system/computer program product for feedback prediction, according to embodiments of this disclosure, could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, by one or more processing units, at least one training message delivered by a user on a social media application, the training message being accessible by an operator;
   recording, by one or more processing units, training feedback performed by the operator on the social media application regarding to the at least one training message;
   training, by one or more processing units, an analysis engine module using (i) the at least one training message as input and (ii) the training feedback as output; and
   generating, by one or more processing units, a predicted feedback for a subsequent message based on the trained analysis engine module.

2. The method of claim 1, wherein the input of the analysis engine module comprises at least one key element extracted from the at least one training message based on automatic analysis of the training message.

3. The method of claim 2, wherein the input of the analysis engine module comprises at least one associated element which is associated with the at least one key element.

4. The method of claim 2, wherein the input of the analysis engine module comprises metadata related to the at least one key element.

5. The method of claim 1, wherein the input of the analysis engine module comprises at least one key element identified by the operator in the at least one training message.

6. The method of claim 1, wherein recording the training feedback comprises:
   matching, by one or more processing units, the training feedback with a first training message of the at least one training message.

7. The method of claim 1, further comprising:
   determining, by one or more processing units, readiness of the analysis engine module.

8. The method of claim 7, further comprising:
   responsive to the readiness of the analysis engine module being higher than a predetermined threshold, generating, by one or more processing units, the predicted feedback automatically on the social media application.

9. The method of claim 7, wherein the determining the readiness comprises:
   identifying, by one or more processing units, a plurality of pairs of test messages and corresponding test feedback;
   determining, by one or more processing units, test predicted feedback generated by the analysis engine module with at least one of test messages as input;
   comparing, by one or more processing units, the test predicted feedback with the corresponding test feedback; and
   determining, by one or more processing units, the readiness of the analysis engine module based on the comparison.

10. The method of claim 9, wherein the plurality of pairs of test messages comprise a message from the at least one training message and the corresponding test feedback comprises feedback from the training feedback.

11. The method of claim 9, wherein the plurality of pairs of test messages comprise a message from the subsequent message, and the corresponding test feedback comprises feedback confirmed by the operator regarding to the subsequent message.

12. A computer program product comprising:
one or more computer readable storage media and program instructions stored on the one or more computer readable storage media, the program instructions comprising:
program instructions to detect at least one training message delivered by a user on a social media application, the training message being accessible by an operator;
program instructions to record training feedback performed by the operator on the social media application regarding to the at least one training message;
program instructions to train an analysis engine module using (i) the at least one training message as input and (ii) the training feedback as output; and
program instructions to generate a predicted feedback for a subsequent message based on the trained analysis engine module.

13. The computer program product of claim 12, wherein the input of the analysis engine module comprises at least one key element extracted from the at least one training message based on automatic analysis of the training message.

14. The computer program product of claim 13, wherein the input of the analysis engine module comprises at least one associated element which is associated with the at least one key element.

15. The computer program product of claim 13, wherein the input of the analysis engine module comprises metadata related to the at least one key element.

16. The computer program product of claim 12, wherein the input of the analysis engine module comprises at least one key element identified by the operator in the at least one training message.

17. The computer program product of claim 12, wherein program instructions to record the training feedback comprise:
program instructions to match the training feedback with a first training message of the at least one training message.

18. The computer program product of claim 12, further comprising:
program instructions, stored on the one or more computer readable storage media, to determine readiness of the analysis engine module.

19. The computer program product of claim 18, further comprising:
program instructions, stored on the one or more computer readable storage media, to, responsive to the readiness of the analysis engine module being higher than a predetermined threshold, generate the predicted feedback automatically on the social media application.

20. A computer system comprising:
one or more processors, one or more computer readable storage media, and program instructions stored on the one or more computer readable storage media for execution by at least one of the one or more processors, the program instructions comprising:
program instructions to detect at least one training message delivered by a user on a social media application, the training message being accessible by an operator;
program instructions to record training feedback performed by the operator on the social media application regarding to the at least one training message;
program instructions to train an analysis engine module using (i) the at least one training message as input and (ii) the training feedback as output; and
program instructions to generate a predicted feedback for a subsequent message based on the trained analysis engine module.

* * * * *